US008698757B2

(12) United States Patent  
Kiyuna

(10) Patent No.: US 8,698,757 B2  
(45) Date of Patent: Apr. 15, 2014

(54) COMPUTER-READABLE STORAGE MEDIUM HAVING CALIBRATION PROGRAM, COORDINATE DETECTION APPARATUS AND CALIBRATION METHOD

(75) Inventor: Tsuyoshi Kiyuna, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 952 days.

(21) Appl. No.: 12/637,191

(22) Filed: Dec. 14, 2009

(65) Prior Publication Data

US 2010/0182260 A1    Jul. 22, 2010

(30) Foreign Application Priority Data

Dec. 15, 2008  (JP) ................................. 2008-318634

(51) Int. Cl.  
*G06F 3/041*  (2006.01)

(52) U.S. Cl.  
USPC ............................ 345/173; 345/158; 345/634

(58) Field of Classification Search  
CPC ...................................................... G06F 3/041  
USPC .......................... 345/158, 173, 660, 418, 634  
See application file for complete search history.

(56) References Cited

U.S. PATENT DOCUMENTS

| 6,215,588 | B1 * | 4/2001 | Wachi ............................ 359/368 |
| 6,955,598 | B2 * | 10/2005 | Hagiwara et al. .................. 463/5 |
| 7,193,626 | B2 * | 3/2007 | Otani et al. .................... 345/418 |
| 7,633,528 | B2 * | 12/2009 | Fukushima et al. ........ 348/211.8 |
| 2005/0017966 | A1 * | 1/2005 | Engl et al. ..................... 345/418 |
| 2011/0032274 | A1 * | 2/2011 | Miyata .......................... 345/660 |
| 2011/0060347 | A1 * | 3/2011 | Coste-Maniere et al. .... 606/130 |
| 2011/0095980 | A1 * | 4/2011 | Sweetser et al. ............. 345/158 |

FOREIGN PATENT DOCUMENTS

| JP | H03054622 | 8/1991 |
| JP | H04332027 | 11/1992 |
| JP | 2001356879 | 12/2001 |
| JP | 2004185512 | 2/2004 |
| JP | 2005-134992 | 5/2005 |

OTHER PUBLICATIONS

Notice of Reasons for Rejection for Japanese Application No. 2008-318634, mailed Apr. 18, 2013.

* cited by examiner

*Primary Examiner* — Thuy Pardo  
(74) *Attorney, Agent, or Firm* — Nixon & Vanderhye PC

(57) ABSTRACT

The present invention is a calibration program executed by a computer of an information processing apparatus which is capable of utilizing designation detection means for detecting a position designation by a user. The calibration program causes the computer to function as designation image display means and calibration means. The designation image display means displays a predetermined designation image indicating a designation reference position which is a predetermined position on display means. The calibration means receives, while the designation image is displayed, a designation by the user using the designation detection means, sets a designated position at which continuous designation by the user has ended as a fixed position, and executes calibration processing in accordance with the fixed position and the designation reference position.

12 Claims, 7 Drawing Sheets

COMPUTER-READABLE STORAGE MEDIUM HAVING CALIBRATION PROGRAM, COORDINATE DETECTION APPARATUS AND CALIBRATION METHOD

CROSS REFERENCE TO RELATED APPLICATION

The disclosure of Japanese Patent Application No. 2008-318634, filed Dec. 15, 2008, is incorporated herein by reference.

FIELD

The present invention relates a computer readable storage medium having stored thereon a calibration program executing calibration on an information processing apparatus including, for example, designation detection means such as a touch panel, a coordinate detection device executing the calibration program, and a calibration method.

BACKGROUND AND SUMMARY

In a display device including a touch panel, there may be a case where coordinates detected by the touch panel deviate from display coordinates on a display section because of the difference in individual touch panels, changes in physical property of apparatus components, and the like. Conventionally, there have been apparatuses which execute calibration in order to correct such deviation. For example, in a touch panel device disclosed in Patent Document 1 (Japanese Laid-Open Patent Publication No. 2005-134992), a designation image is displayed on a predetermined position on a display section, so as to cause the user to touch the designation image, whereby the calibration is executed. Specifically, in the touch panel device disclosed in Patent Document 1, a designation image is displayed at predetermined nine positions on the touch panel device. When the user presses (performs touch-on) the designation image with a pen or his/her finger, the pressed position is detected. Next, the touch panel device determines an arithmetic expression for correction in accordance with the pressed position and a designation reference position of the designation image, thereby executing calibration. The touch panel device then corrects the deviation between the detected coordinates on the touch panel and the display coordinates on the display section in accordance with the determined arithmetic expression for correction.

However, the touch panel device disclosed in Patent Document 1 has the following problem. That is, the user need accurately perform touch-on of a display image when executing calibration. When the user has failed to accurately perform touch-on of the display image, there has been a case where the user need touch the display image again, or a case where the amount of correction determined by executing the calibration is inaccurate. Further, in the touch panel device disclosed in Patent Document 1, the user cannot check whether or not the user has performed touch-on of the display image accurately.

Therefore, an object of the present invention is to provide a calibration program allowing the user to perform calibration simply and accurately, and an apparatus and a calibration method for executing the calibration program.

The present invention has the following features to attain the object mentioned above. It is noted that reference numerals, supplementary descriptions and the like indicated in parentheses in this section are merely provided to facilitate the understanding of the present invention in relation to the later-described embodiment, rather than limiting the present invention in any way.

A first aspect is a computer readable storage medium having stored thereon a calibration program executed on a computer (CPU core 21) of an information processing apparatus (game apparatus 10) capable of utilizing designation detection means (touch panel 15) for detecting a position designation by a user. The calibration program causes the computer to function as designation image display means (step S13 in FIG. 10, hereinafter representing step numbers only), and calibration means (S15, S23). The designation image display means display a predetermined designation image (designation line 40a and designation line 40b) indicating a designation reference position which is a predetermined position on display means. The calibration means receives, while the designation image is displayed, a designation by the user using the designation detection means, sets a designated position at which continuous designation by the user has ended as a fixed position, and executes calibration processing in accordance with the fixed position and the designation reference position.

It is noted that, in the present specification, the "calibration processing" represents processing for adjustment for associating the designated position by the designation detection means with the display position on the display means. Typically, this represents processing for correcting the relation between an output from the designation position detection means and the display position (e.g., a formula for conversion from the output to display position coordinates) in order to associate the output from the designation position detection means with the display position on the display means and to obtain the resultant.

According to the first aspect, when the user has confirmed that the designated position by the designation detection means is associated with the display position of the designation image on the display means, the user ends the position designation. Consequently, the user can determine the designated position at the end time as a fixed position. Accordingly, the user can accurately associate the designated position by the designation detection means with the display position of the designation image, and perform accurate calibration.

In a second aspect, the information processing apparatus is further capable of utilizing input means (input device), and the calibration program may further causes the computer to function as designation image moving means (S19). The designation image moving means moves the designation reference position, while receiving the continuous designation by the user, in accordance with an input by the user to the input means. The calibration means determines an amount for coordinate correction in accordance with the fixed position and the designation reference position which is moved by the designation image moving means.

According to the second aspect, when the user has failed to accurately designate the designation reference position, it is possible to move the designation reference position to a position designated by the user. Accordingly, the user can associate the position designated by the user with the designation reference position accurately, and can perform highly accurate calibration.

In a third aspect, the designation detection means may be a touch panel.

According to the third aspect, the user can perform position designation by using the touch panel.

In a fourth aspect, the calibration means may set the designated position at which touch-off is performed on the touch panel as the fixed position, and execute the calibration processing in accordance with the fixed position and the designation reference position.

According to the fourth aspect, the user can perform calibration in accordance with the touched position at which touch-off is performed. Accordingly, it is possible to perform calibration accurately with a simple operation.

In a fifth aspect, the designation image display means may display, on the display means, a designation range image designation range image (designation range frame 41) indicating a predetermined range including the designation reference position. In addition, the calibration means executes the calibration processing only when the fixed position stays within the predetermined range.

According to the fifth aspect, a range for a position to be designated by the user can be displayed. Accordingly, it is possible to encourage the user to designate a position. Further, when the user designates a position outside the above range, it is possible to process the designation as an error operation by the user.

In a sixth aspect, when a designated position detected by the designation detection means has moved until the continuous designation by the user ends, the designation image display means moves the designation reference position in accordance with the direction in which the designated position has moved and the amount of the movement (S18).

According to the sixth aspect, even when the user has moved the designated position until the continuous designation by the user ends, in accordance with the amount of movement, the designation reference position moves. Thus, the user can accurately cause the position of the designation image to coincide with the fixed position by using the designation image moving means.

In a seventh aspect, the input means may perform a relative movement designation in accordance with an operation by the user, thereby to move the designation reference position. Here, the relative movement designation represents designation of movement by inputting a moving direction or an amount of movement.

According to the seventh aspect, the user can move the designation reference position in a desired direction by a desired distance by using the input means.

In an eighth aspect, the input means may be a direction designation switch (the cross switch 14a of the input device).

According to the eighth aspect, the user can move the designation image in a desired direction by using the direction designation switch.

In a ninth aspect, the designation image display means may repeat display of the designation image for a predetermined number of cycles, and change the designation reference position at each cycle (S13). In this case, the calibration means may fix the fixed position for each cycle, while the designation image display means repeats the display of the designation image for the predetermined number of cycles (in the case of Yes in S22), set the designation reference position and the fixed position at each cycle as a pair of correction data, and execute the calibration processing in accordance with each pair of correction data.

According to the ninth aspect, it is possible to allow the user to designate the designation image a plurality of number of times. Accordingly, it is possible to perform highly accurate calibration processing.

A tenth aspect is a coordinate detection device, and the coordinate detection device includes designation detection means (touch panel 15), designation image display means (S13), and calibration means (S15, S23). The designation detection means detects a position designation by a user. The designation image display means displays a predetermined designation image indicating a designation reference position which is a predetermined position on display means. The calibration means receives, while the designation image is displayed, a designation by the user using the designation detection means, sets a designated position at which continuous designation by the user has ended as a fixed position, and performs calibration processing in accordance with the fixed position and the designation reference position.

According to the present invention, the user can designate the designation image accurately and easily, and thus can perform calibration with high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating an image obtained after a designation line 40a moves in response to the user's pressing a left switch of a cross switch 14a;

FIG. 6 is a diagram illustrating an image obtained after a designation line 40b moves in response to the user's pressing an upper switch of the cross switch 14a;

DESCRIPTION OF THE PREFERRED EMBODIMENTS

Description of Game Apparatus

Figure 1:
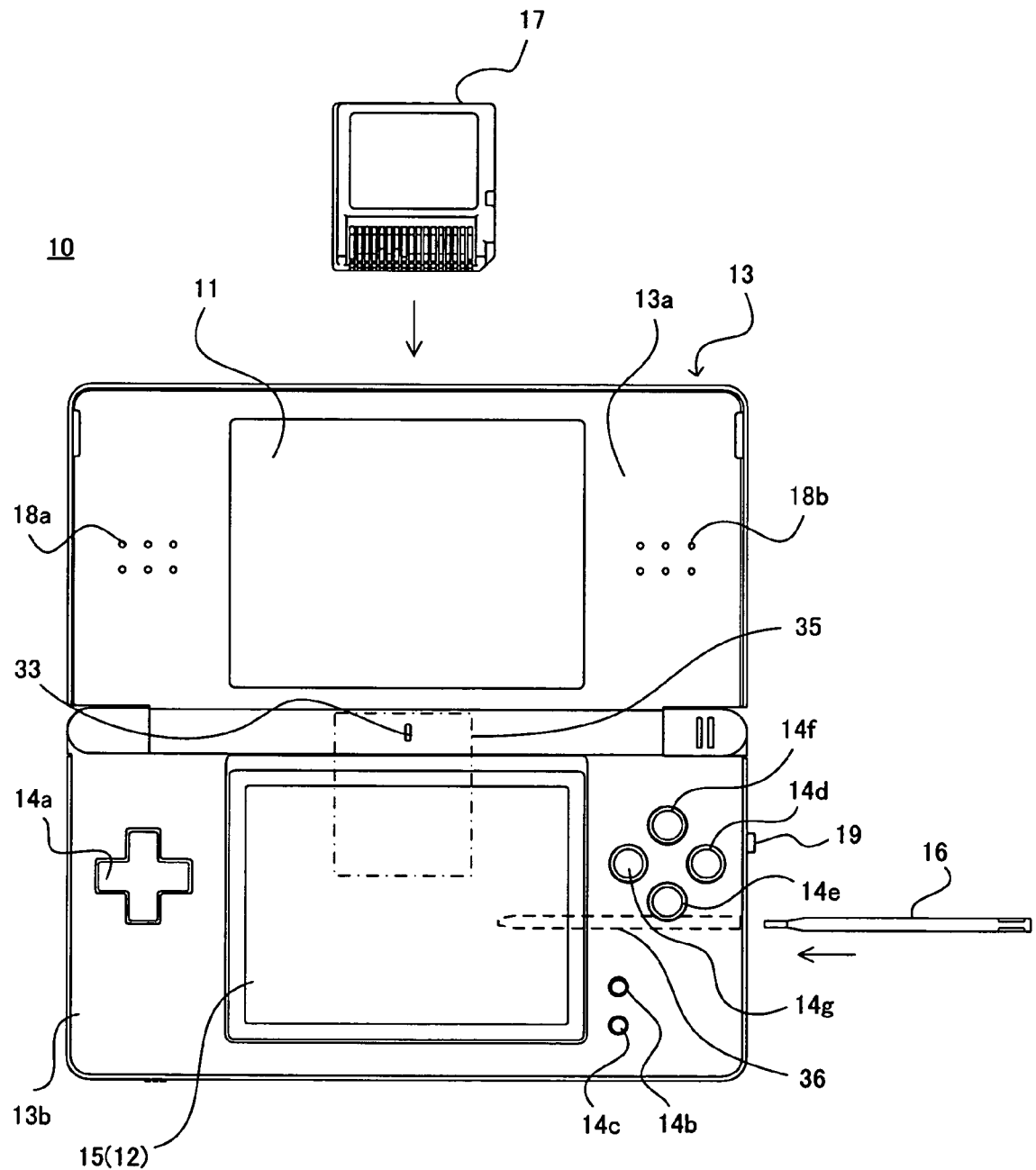
FIG. 1 is an external view of a hand-held game apparatus according to one embodiment.

With reference to drawings, a hand-held game apparatus according to one embodiment of the present invention, which executes a calibration program, will be described. FIG. 1 is an external view of the hand-held game apparatus according to the one embodiment of the present invention. It is noted that the present invention is not limited to a hand-held game apparatus, but may be applicable to any information processing apparatus having a display device and a touch panel (e.g., a PDA (Personal Digital Assistant), a portable phone, a tablet-type personal computer, an ATM device, a multi-media terminal, and the like).

In FIG. 1, the game apparatus 10 includes a first LCD (Liquid Crystal Display) 11 and a second LCD 12. A housing 13 comprises an upper housing 13a and a lower housing 13b. The first LCD 11 is accommodated in the upper housing 13a and the second LCD 12 is accommodated in the lower housing 13b. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 3) to an exterior. A description of the pair of loudspeakers will be provided later. A hole 33 for a microphone is provided at a hinge portion which connects the upper housing 13a and lower housing 13b in a pivotable manner.

The lower housing 13b is provided with input devices as follows; a cross switch 14a, a start switch 14b, a select switch 14c, an "A" button 14d, a "B" button 14e, an "X" button 14f, and a "Y" button 14g. In addition, on a side surface of the lower housing 13b, an "L" button and an "R" button (not shown) are provided. In addition, a touch panel 15 which is a designation detection device is attached on a screen of the second LCD 12 as another input device. On the side surface of the lower housing 13b, a power switch 19, an insertion slot 35 (indicated by a dashed line in FIG. 1) for connecting a memory card 17, and an insertion slot 36 for storing a stick 16 (indicated by a dotted line in FIG. 1) are provided.

The touch panel 15 may be of any type such as a resistive film type, an optical type (infrared type), or a capacitive coupling type. In the present embodiment, the touch panel 15 is of the resistive film type. Touch panel 15 can be operated by not only the stick 16 but also a finger. The touch panel 15 used in the present embodiment has the same resolution at 256 dots×192 dots (detection accuracy) as that of the second LCD 12. However, resolutions of the touch panel 15 and the second LCD 12 is not required to necessarily be the same as each other.

The memory card 17 includes a ROM 17a having a game program stored therein and a EEPROM 17b having backup data rewritably stored therein and is placed in the insertion slot 35 provided in the lower housing 13b in a removable manner. Though not shown in FIG. 1, provided in a depth end of the insertion slot 35 is a first connector 23 (see FIG. 2) for connecting with a connector provided at an insertion direction end portion of the memory card 17. When the memory card 17 is inserted into the insertion slot 35, the connectors are mutually connected, causing a CPU core 21 (see FIG. 2) of the game apparatus 10 to access the memory card 17.

Figure 2:
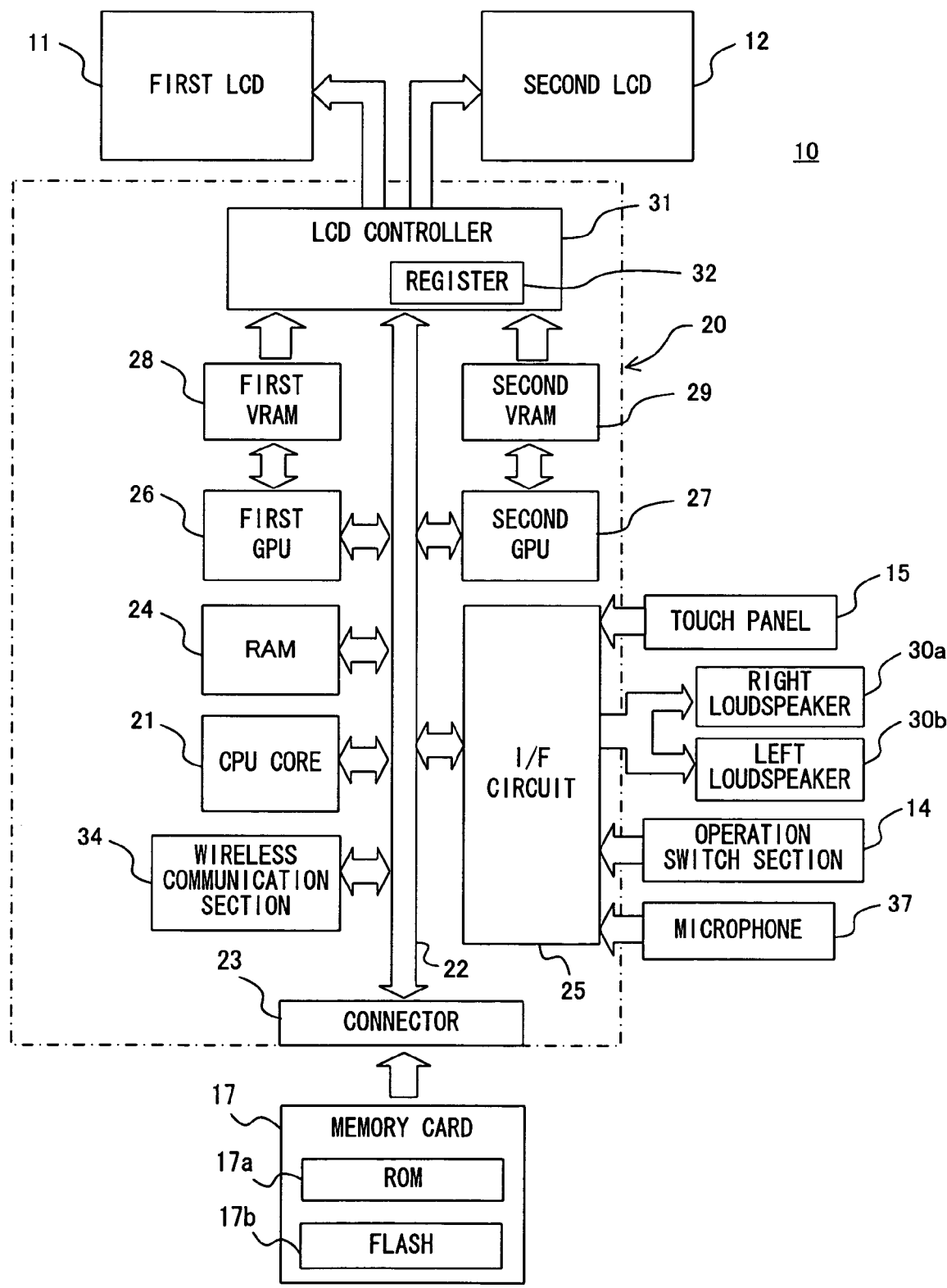
FIG. 2 is a block diagram illustrating an internal configuration of a game apparatus 10.

Next, an internal configuration of the game device 10 will be described with reference to FIG. 2. FIG. 2 is a block diagram illustrating the internal configuration of the game apparatus 10. In FIG. 2, the CPU core 21 is mounted on an electronic circuit board 20 which is to be housed in the housing 13. Via a bus 22, the CPU core 21 is connected to a connector 23, an input/output interface circuit (shown as an I/F circuit in the diagram) 25, a first GPU (Graphics Processing Unit) 26, a second GPU 27, a RAM 24, a LCD controller 31, and a wireless communication section 34. The memory card 17 is connected to the connector 23 in a removable manner. Connected to the I/F circuit 25 are a touch panel 15, a right loudspeaker 30a, a left loudspeaker 30b, an operation switch section 14, which is comprised of the cross switch 14a, the "A" button 14d, and others as shown in FIG. 1, and a microphone 37. The right loudspeaker 30a and the left loudspeaker 30b are arranged inside the sound holes 18a and 18b, respectively. The microphone 37 is arranged inside the hole 33 for the microphone.

A first VRAM (Video RAM) 28 is connected to the first GPU 26, and a second VRAM 29 is connected to the second GPU 27. In accordance with an indication from the CPU core 21, the first GPU 26 generates a first display image and writes it into the first VRAM 28. The second GPU 27 also follows an indication from the CPU core 21 to generate a second display image and writes it into the second VRAM 29. The first VRAM 28 and the second VRAM 29 are connected to the LCD controller 31.

The LCD controller 31 includes a register 32. The register 32 stores a value of either 0 or 1 in accordance with an indication from the CPU core 21. When the value of the register 32 is 0, the LCD controller 31 outputs to the first LCD 11 the first display image which has been written into the first VRAM 28, and outputs to the second LCD 12 the second display image which has been written into the second VRAM 29. When the value of the register 32 is 1, the first display image which has been written into the first VRAM 28 is outputted to the second LCD 12, and the second display image which has been written into the second VRAM 29 is outputted to the first LCD 11.

The wireless communication section 34 has a function of receiving and transmitting data to and from a wireless communication section of other game device. In addition, the game apparatus 10 can be connected to a wide area network such as the Internet via the wireless communication section 34 and also can communicate with other game apparatus via a network.

Description of Calibration Method

Next, with reference to FIG. 3 to FIG. 8, an outline of a calibration program according to the present invention will be described. The calibration program according to the present invention is loaded into the RAM 24 when a user explicitly indicates the execution thereof, and then executed by the CPU core 21. The calibration program is stored, in advance, in a nonvolatile memory (not shown) in the game apparatus 10. In the present embodiment, the calibration processing is executed by causing the user to highly accurately designate two points on the second LCD 12.

Figure 3:
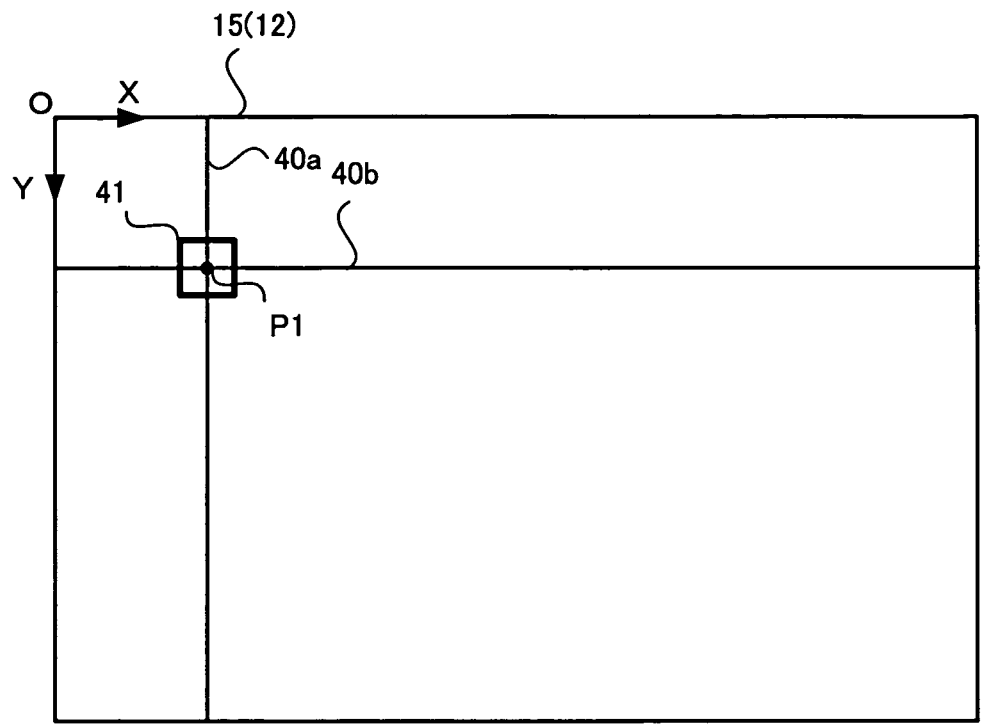
FIG. 3 is a diagram illustrating an image displayed for designation of a first point when a calibration program according to the present embodiment is executed.

First, the CPU core 21 displays an image on the second LCD 12 so as to encourage the user to designate the first point. FIG. 3 is a diagram illustrating an image displayed for designation of the first point when the calibration program according to the present embodiment is executed. In FIG. 3, a designation line 40a, a designation line 40b, and a designation range frame 41 are displayed so as to indicate a designation reference position P1 for causing the user to perform position designation. As shown in FIG. 3, on the second LCD 12, a point on the upper left side of the screen is set as the origin O, and the X-axis (coordinate value 0 to 255), and the Y-axis (coordinate value 0 to 191) are arranged in the right direction from the origin O, and in the lower direction from the origin O, respectively. The designation reference position P1 indicates a position on the second LCD 12, and is represented by coordinate values along the X-axis and the Y-axis. The designation line 40a and the designation line 40b are displayed on the second LCD 12 such that the intersection therebetween indicates the designation reference position P1. The designation line 40a is a straight line parallel to the Y-axis, and the designation line 40b is a straight line parallel to the X-axis. In addition, the designation range frame 41 is an image indicating a predetermined range including the designation reference position P1, and is displayed so as to encourage the user to perform position designation. In FIG. 3, although the designation reference position P1 is displayed as a black point image, the black point is not actually displayed, and instead, the designation reference position P1 is indicated based on the designation line 40a and the designation line 40b.

When the image shown in FIG. 3 is displayed, the user touches (designates) the designation reference position P1 using the stick 16. When the user has touched the touch panel 15, the touch panel 15 transmits a voltage value indicating the touched position (designated position) to the CPU core 21 through the I/F circuit 25. The voltage value indicating the touched position on the touch panel 15 is detected constantly, and the voltage value indicating the touched position is transmitted to the CPU core 21 at predetermined unit time intervals. On the other hand, when the user does not touch the touch panel 15, the touch panel 15 transmits, to the CPU core 21, a value indicating that no touching is performed. The CPU core 21 temporarily stores the received voltage value indicating the touched position on the touch panel 15 in the RAM 24. Therefore, in the RAM 24, the voltage value indicating the latest touched position detected by the touch panel 15 is stored. That is, when the user moves the stick 16 while the stick 16 is kept touching the touch panel 15, the voltage value indicating the touched position obtained after the movement is stored in the RAM 24. When the user removes the stick 16 from the touch panel 15 (touch-off), the CPU core 21 determines the voltage value indicating the touched position at which the touch-off is performed as the voltage value of a fixed position, and stores the voltage value in the RAM 24. The fixed position is a touched position fixed by the user on the touch panel 15. Namely, the fixed position is a position, on the touch panel 15, based on which the user is considered to have surely touched the designation reference position P1, and is used as reference data for executing calibration. The CPU core 21 obtains a correction formula in accordance with the fixed position on the touch panel 15 and the designation reference position P1 on the second LCD 12. When the user has performed touch-off at a position outside the designation range frame 41, the CPU core 21 determines that the position designation has failed and encourages the user to perform another input. Further, when the user performs touch-on at a position outside the designation range frame 41, the CPU core 21 may determine that the position designation has failed when the touch-on has been performed, and encourage the user to perform another input.

Figure 4:
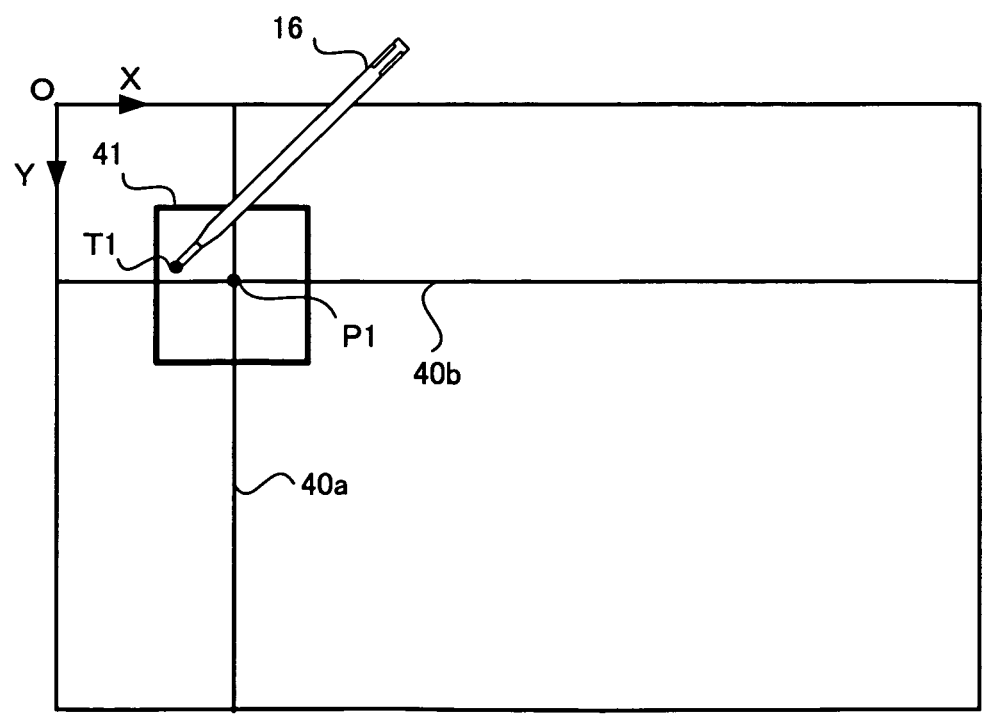
FIG. 4 is a diagram illustrating, in an enlarged manner, an appearance of a state where a user touches a point in a designation range frame 41 using a stick 16.

FIG. 4 is a diagram illustrating, in an enlarged manner, an appearance of a state where a user touches a point in the designation range frame 41 using the stick 16. As shown in FIG. 4, the position (touched position) T1 touched by the user does not coincide with the designation reference position P1. In FIG. 4, the touched position T1 is displayed as a black point, however, the black point is not actually displayed on the second LCD 12.

Figure 5:
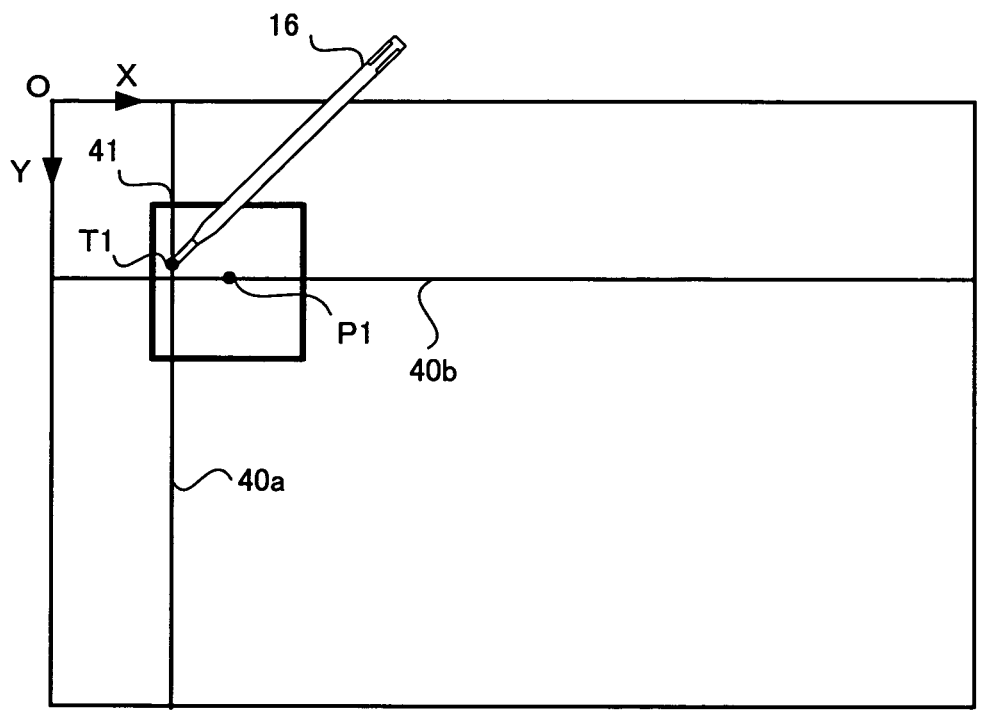

In this case, the user keeps touching the touch panel 15 with the stick 16 and moves the designation line 40a and the designation line 40b using the cross switch 14a so that the touched position T1 coincide with the designation reference position P1. Specifically, the user presses the left switch of the cross switch 14a so that the designation line 40a passes through the touched position T1. When the left switch of the cross switch 14a is pressed, the CPU core 21 moves the designation line 40a toward the negative direction of the X-axis (left direction) by a predetermined distance. Namely, the CPU core 21 moves the designation line 40a in a direction indicated by the cross switch 14a by a predetermined distance. Then, the user presses the left switch of the cross switch 14a until the designation line 40a passes through the touched position T1. FIG. 5 is a diagram illustrating an image obtained after the designation line 40a moves in response to the user's pressing the left switch of the cross switch 14a. As shown in FIG. 5, the designation line 40a indicating the value of the X-coordinate of the designation reference position P1 moves to the left relative to the position shown in FIG. 4, and coincides with the value of the X-coordinate of the touched position T1.

Figure 6:
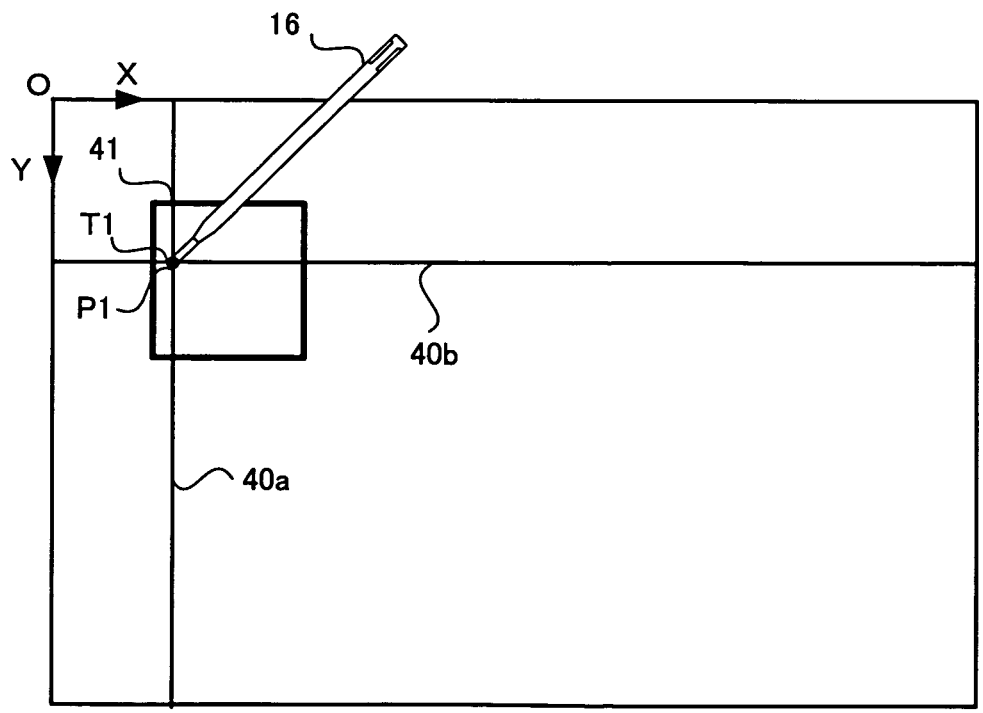

Further, the user presses the upper switch of the cross switch 14a so that the designation line 40b passes through the touched position T1. When the upper switch of the cross switch 14a is pressed, the CPU core 21 moves the designation line 40b toward the negative direction (upper direction) of the Y-axis by a predetermined distance. FIG. 6 is a diagram illustrating an image obtained after the designation line 40b moves in response to the user's pressing an upper switch of the cross switch 14a. As shown in FIG. 6, the designation line 40b indicating the value of the Y-coordinate of the designation reference position P1 moves upwardly relative to the position shown in FIG. 4, and coincides with the value of the Y-coordinate of the touched position T1.

When confirming that the touched position T1 coincides with the designation reference position P1, the user performs touch-off (removes the stick 16 from the touch panel 15). Upon detection of the touch-off, the CPU core 21 stores, in the RAM 24, the voltage value indicating the touched position at which touch-off is performed as the fixed position for the designation reference position P1.

In this manner, the user can move the designation line 40a and the designation line 40b intuitively and easily, and thus can easily achieve coincidence between the touched position T1 and the designation reference position P1.

Next, a case where the user moves the touched position T1 while the stick 16 is kept touching the touch panel 15, as shown in FIG. 4, will be described.

Figure 7:
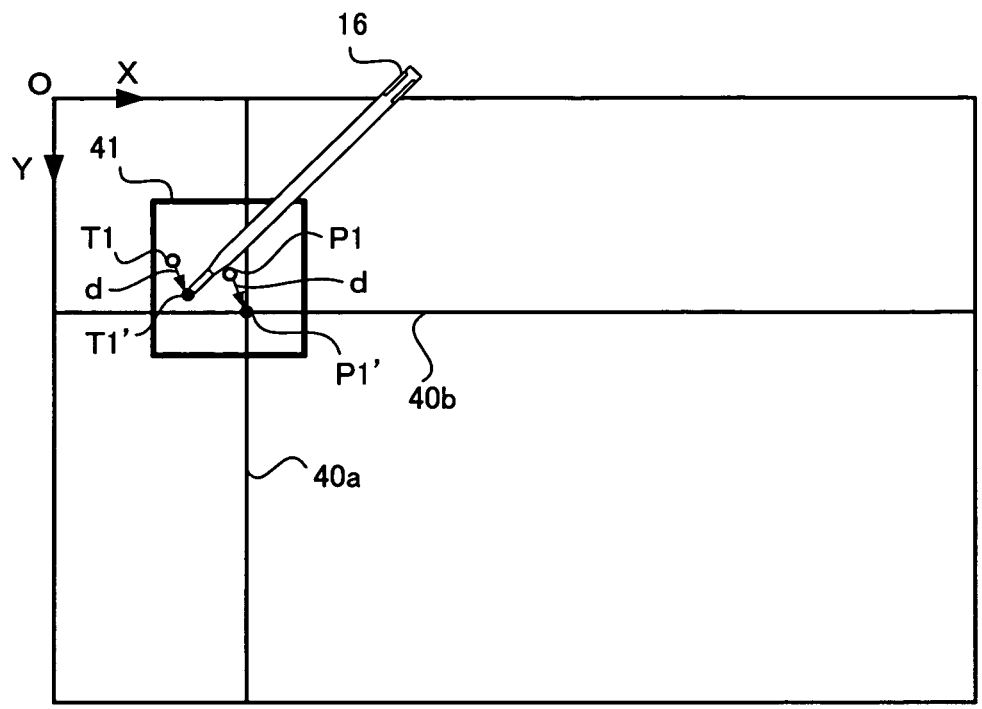
FIG. 7 is a diagram illustrating an image displayed when the user has moved the stick 16 from a touched position displayed on FIG. 4 while the stick 16 is kept touching the touch panel 15.

FIG. 7 is a diagram illustrating an image displayed when the user moves the stick 16 from the touched position displayed on FIG. 4 while the stick 16 is kept touching the touch panel 15. As shown in FIG. 7, the touched position is moved toward a direction indicated by the arrow by an amount of movement d, and the touched position is changed to a position T1'. In this case, the designation reference position P1 is also moved toward the same direction by the amount of movement d. Specifically, assuming that the X-direction component of the amount of movement d is set as dx and the Y-direction component of the amount of movement d is set as dy, the designation line 40a moves toward the positive direction of the X-axis by an amount of dx, and the designation line 40b moves toward the positive direction of the Y-axis by an amount of dy, whereby the designation reference position P1 moves. In this manner, in accordance with the movement of the touched position T1, the designation reference position P1 also moves toward the same direction by the same amount. Thus, even when the touched position has moved while the user operates the cross switch 14a, it is possible to accurately achieve coincidence between the designation reference position P1 and the touched position by using the cross switch 14a. Namely, even when the touched position moves while the user moves the designation reference position so as to approximate to the touched position by using the cross switch 14a, the positional relation between the designation reference position and the touched position is maintained, and the user can restart the operation for achieving coincidence between the designation reference position and the touched position.

Figure 8:
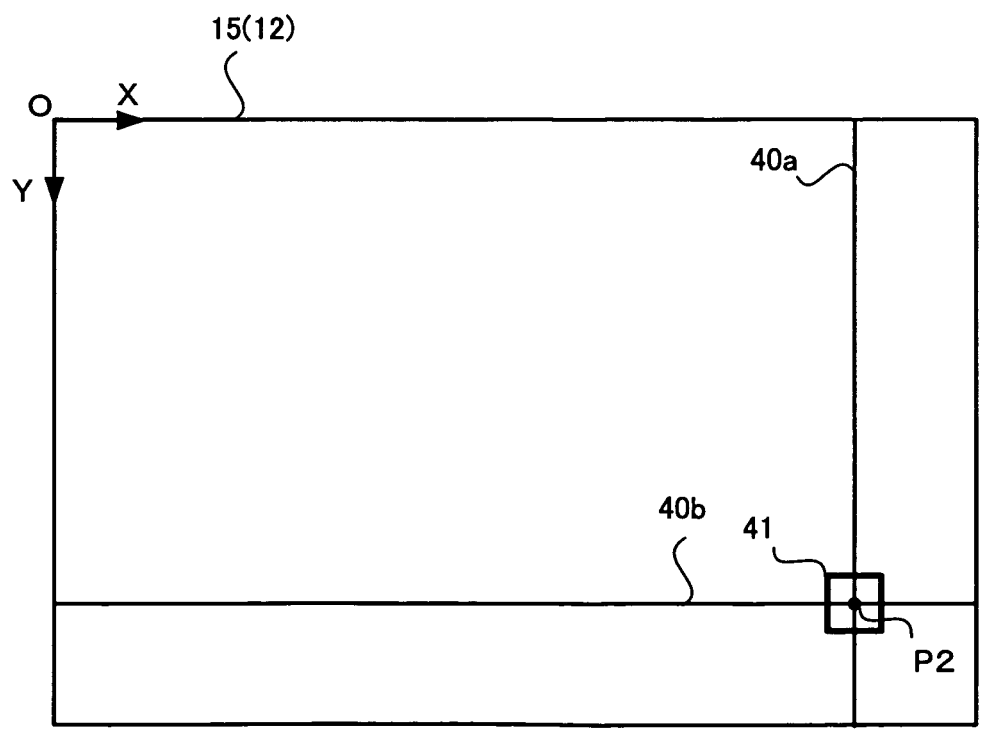
FIG. 8 is a diagram illustrating an image displayed on a second LCD 12 for designation of a second point.

Next, when the user determines the fixed position for the first designation reference position P1, the CPU core 21 displays on the second LCD 12 an image indicating designation of a second point. FIG. 8 is a diagram illustrating an image displayed on the second LCD 12 for designation of the second point. As shown in FIG. 8, the second designation reference position P2 is displayed on a position different from the first designation reference position P1 (position on the lower right side of the screen). By using the procedure similar to that for the first designation reference position P1, the fixed position for the second designation reference position P2 is determined.

Coincidence between the designation reference position P and the fixed position is achieved as above, and accordingly highly accurate calibration can be executed.

Figure 9:
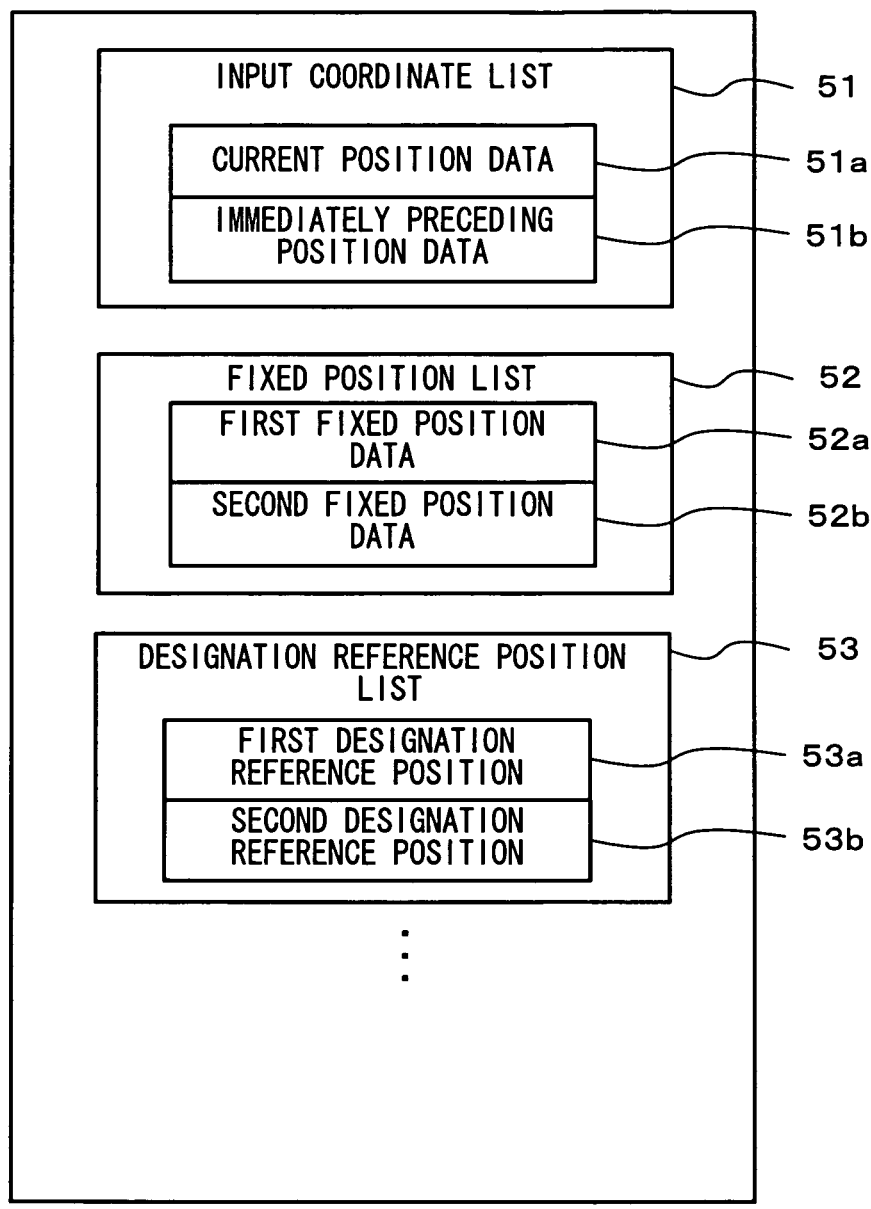
FIG. 9 is a diagram showing a memory map of a RAM 24 in the game apparatus 10.

Next, processing of the calibration program according to the present embodiment will be described in detail. First, data stored in the RAM 24 during the calibration processing will be described. FIG. 9 is diagram a showing a memory map of the RAM 24 in the game apparatus 10. For the calibration processing, an input coordinate list 51, a fixed position list 52, a designation reference position list 53, and the like are stored in the RAM 24. In addition to these pieces of data, the calibration program or data of program images, input data to be inputted by a user to an input device (such as the cross switch 14a or the like), and the like are stored in the RAM 24.

The input coordinate list 51 is data of a set of voltage values corresponding to coordinate values each indicating a position, on the touch panel 15, at which the user has performed an input operation. In the present embodiment, the voltage value indicating the position on the touch panel 15 at which the user has performed an input operation is detected at predetermined unit time intervals (1 frame time). The detected voltage value is converted by using a predetermined method, whereby the touched position is represented by coordinate values. In the present embodiment, the voltage value (current position data 51a) indicating the position (current position) on the touch panel 15 currently detected and the voltage value (immediately preceding position data 51b) indicating the position (immediately preceding position) on the touch panel 15 detected immediately precedingly are stored in the input coordinate list 51. Namely, in each frame time, the voltage value indicating a position detected in the frame time is stored in the input coordinate list 51 as the current position data 51a, and the voltage value indicating the position detected in the immediately preceding frame time is stored in the input coordinate list 51 as the immediately preceding position data 51b. More specifically, in each frame time, the current position data 51a in the input coordinate list 51 is updated with a voltage value indicating coordinate values (X3, Y3), and the immediately preceding position data 51b in the input coordinate list 51 is updated with the current position data 51a stored, immediately preceding to the update, in the input coordinate list 51. In the current frame time, when no touching on the touch panel 15 is detected, a value indicating that no touching is performed is stored as the current position in the input coordinate list 51.

The fixed position list 52 is data of a set of voltage values corresponding to coordinate values each indicating a position, on the touch panel 15, obtained when the user has fixed the touched position. When the user removes the stick 16 from the touch panel 15 (in the case of touch-off), the voltage value indicating the touched position at which touch-off is performed is stored in the fixed position list 52 as the voltage value (fixed position data) indicating the fixed position. In the present embodiment, display of the designation reference position P and determination of the fixed position are performed for a predetermined number of times. Thus, the fixed position data is stored in series, and the predetermined number of pieces of fixed position data are stored in the fixed position list 52 finally. Specifically, the first fixed position data 52a is stored as the first data in the fixed position list 52, and the second fixed position data 52b is stored as the second data in the fixed position list 52.

The designation reference position list 53 is data of a set of coordinate values (coordinate value group) (on the second LCD 12) indicating a position to be touched by the user. In the present embodiment, the designation reference position P indicating the position to be touched by the user is displayed for a predetermined number of times. In the present embodiment, the coordinate values of the designation reference position P are stored in series in the designation reference position list 53. Specifically, the coordinate values of the first designation reference position P are stored as the first data in the designation reference position list 53, and the coordinate values of the second designation reference position P are stored as the second data in the designation reference position list 53. As above described, the designation reference position P is initially displayed at a predetermined position at each time, accordingly (FIG. 3 and FIG. 8). That is, when the calibration program is executed, for respective designation reference positions P (designation reference position 53a and the designation reference position 53b) in the designation reference position list 53, predetermined coordinate value sets, which are different from one another, are initially stored. On the other hand, the user touches the displayed designation reference position P (the intersection between the designation line 40a and the designation line 40b shown in FIG. 3), and moves, if necessary, the designation reference position P using the cross switch 14a (moves the designation line 40a and the designation line 40b, as shown in FIG. 5 and FIG. 6). Further, as above described, when the user has moved the touched position while keeping touching, the designation reference position P moves in accordance with the amount of movement of the touched position (FIG. 7). In this manner, when the designation reference position P has moved, the coordinate values stored in the designation reference position list 53 are updated.

Figure 10:
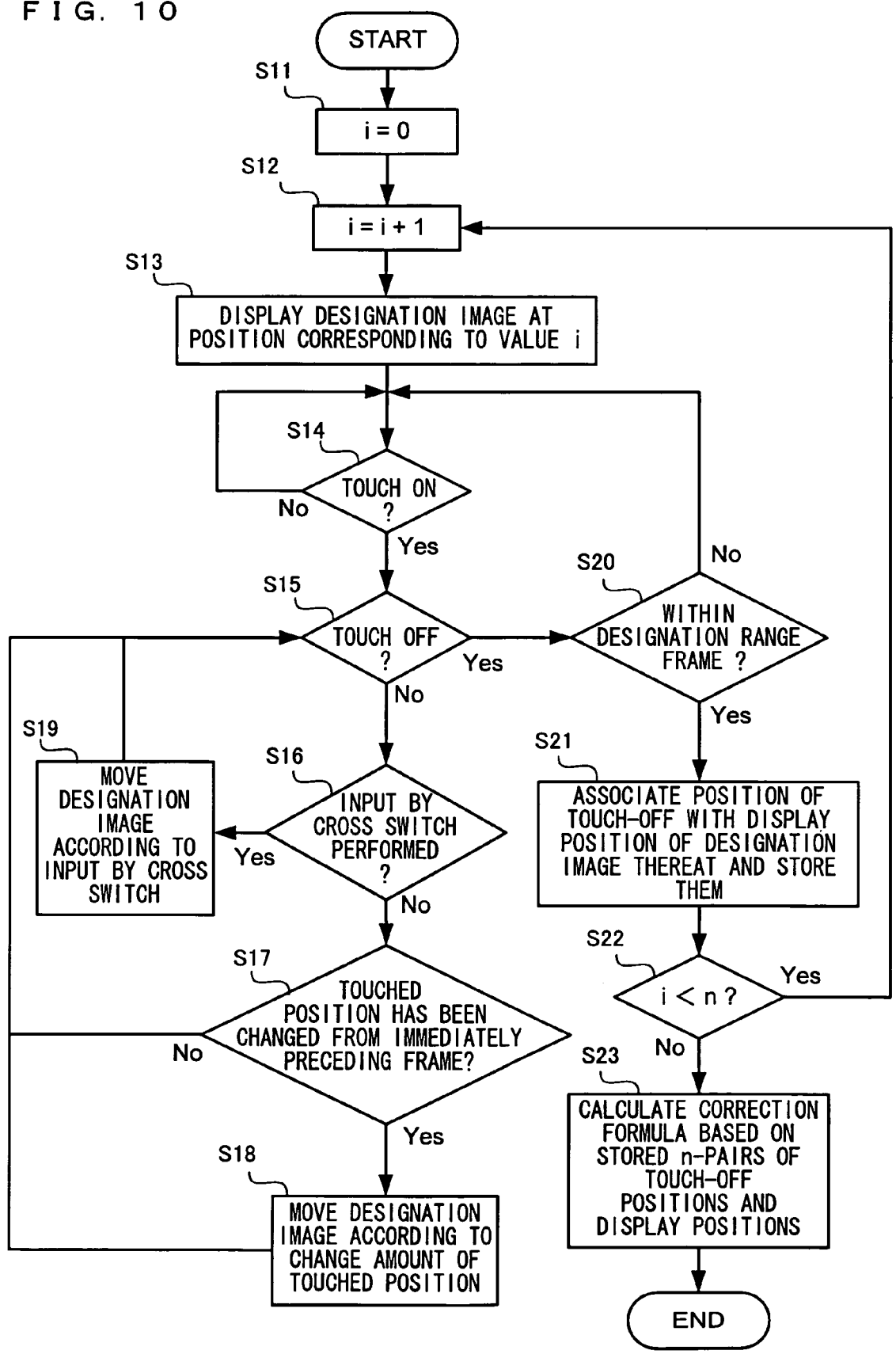
FIG. 10 is a flowchart showing, in detail, calibration processing according to the present embodiment.

Next, the calibration processing will be described in detail with reference to FIG. 10. FIG. 10 is a flowchart showing, in detail, the calibration processing according to the present embodiment.

Firstly, in step S11, the CPU core 21 sets the counter i to 0. The counter i indicates the number of times the designation image is displayed. Namely, in the calibration processing, when the first designation image is to be displayed (when the image shown in FIG. 3 is to be displayed), the counter i indicates 1, and when the second designation image is to be displayed (when the image shown in FIG. 8 is to be displayed), the counter i indicates 2. Next, the CPU core 21 performs a process in step S12. In step S12, the CPU core 21 adds 1 to the value of the counter i and stores the resultant value as a new value of the counter i. Next, the CPU core 21 performs a process in step S13.

In step S13, the CPU core 21 displays designation reference position P on a position corresponding to the value of the counter i. Namely, the CPU core 21 displays the designation line 40a and the designation line 40b on the second LCD 12 in accordance with the value of the counter i. Specifically, the CPU core 21 obtains the i-th designation reference position P in the designation reference position list 53 stored in the RAM 24. The CPU core 21 displays, on the second LCD 12, the designation line 40a and the designation line 40b in accordance with the X-coordinate value and the Y-coordinate value of the obtained designation reference position P, respectively. It is noted that the designation reference position P is previously defined and varies depending on the value of the counter i (e.g., the position shown in FIG. 3 for the first time, and the position shown in FIG. 8 for the second time). Next, the CPU core 21 performs a process in step S14.

In step S14, the CPU core 21 determines whether or not touch-on has been performed on the touch panel 15. In the determination in step S14, when the voltage value detected by the touch panel 15 in the preceding frame time indicates that no touching is performed, and when a touched position is detected in the current frame time, then the CPU core 21 determines that touch-on has been performed. Specifically, when the immediately preceding position data 51b in the input coordinate list 51 represents a value that indicates that no touching is detected, and when the current position data 51a in the input coordinate list 51 represents a voltage value indicating a touched position, then the CPU core 21 detects touch-on. When the determination result is Yes, the CPU core 21 performs a process in step S15. When the determination result is No, the CPU core 21 repeatedly performs the process in step S14.

In step S15, the CPU core 21 determines whether or not touch-off is performed on the touch panel 15. In the determination in step S15, when the touched position is detected by the touch panel 15 in the preceding frame time, and when the voltage value detected in the current frame time indicates that no touching is performed, then the CPU core 21 determines that touch-off has been performed. Specifically, when the immediately preceding position data 51b in the input coordinate list 51 represents a voltage value that indicates a touched position, and when the current position data 51a in the input coordinate list 51 represents a value that indicates no touching is performed, then the CPU core 21 detects touch-off. When the determination result is No, the CPU core 21 performs processes in steps S16 to S19 subsequently. On the other hand, when the determination result is Yes, the CPU core 21 performs a process in step S20 subsequently.

In step S16, the CPU core 21 determines whether or not an input to the cross switch 14a has been performed. When the determination result is Yes, the CPU core 21 performs a process in step S19 subsequently. When the determination result is No, the CPU core 21 performs a process in step S17 subsequently.

In step S17, the CPU core 21 determines whether or not the touched position has been changed from that in the preceding frame. In step S17, the CPU core 21 determines whether or not the touched position has been changed from that in the preceding frame as follows. That is, the CPU core 21 compares the current position data 51a and the immediately preceding position data 51b stored in the input coordinate list 51, and determines that the touched position has been changed from that in the preceding frame when the current position data 51a is different from the immediately preceding position data 51b. On the other hand, when the current position data 51a coincides with the immediately preceding position data 51b, the CPU core 21 determines that the touched position has not been changed from that in the preceding frame. When the determination result is Yes, the CPU core 21 performs a process in step S18 subsequently. When the determination result is No, the CPU core 21 returns the processing to step S15 subsequently.

In step S18, since the touched position has been changed from that in the preceding frame, the CPU core 21 calculates the amount of change of the touched position in the current frame from that in the preceding frame, and changes the coordinate values of the designation reference position P by an amount corresponding to the amount of change. Specifically, the CPU core 21 calculates a difference between the coordinate values (X2, Y2) indicated by the current position data 51a and the coordinate values (X1, Y1) indicated by the immediately preceding position data 51b, which are stored in the input coordinate list 51, thereby calculating a movement vector (X2-X1, Y2-Y1) indicating the direction and amount of the movement. Further, the CPU core 21 adds the calculated movement vector to the designation reference position P stored in the designation reference position list 53 (calculates a sum between the position vector of the designation reference position P and the movement vector) so as to calculate the coordinate values of a new designation reference position P, and updates the coordinate values of the designation reference position P in the designation reference position list 53. Here, the designation reference position P for each time is updated in the designation reference position list 53. That is, in accordance with the value of the counter i, the coordinate values indicating the i-th designation reference position P stored in the designation reference position list 53 are updated. Further, the CPU core 21 moves the designation line 40a and the designation line 40b in response to the update of the coordinate values of the designation reference position P. Next, the CPU core 21 returns the processing to step S15.

On the other hand, when it is determined in step S16 that an input to the cross switch 14a has been performed, a process in step S19 is executed. In step S19, the CPU core 21 moves the designation reference position P in accordance with the input to the cross switch 14a. Specifically, the CPU core 21 changes the coordinate values of the designation reference position P in a direction indicated by the cross switch 14a by a predetermined amount. For example, when the left or right switch of the cross switch 14a is pressed, the CPU core 21 changes the value of the X-coordinate of the designation reference position P stored in the designation reference position list 53 by an amount corresponding to the time during which the cross switch 14a is pressed, and updates the coordinate value of the designation reference position P. More specifically, when the left switch of the cross switch 14a is pressed, the CPU core 21 decrements the value of the X-coordinate of the designation reference position P by a predetermined amount, and when the right switch of the cross switch 14a is pressed, the CPU core 21 increments the value of the X-coordinate of the designation reference position P by a predetermined amount. In a similar manner, when the upper switch of the cross switch 14a is pressed, the CPU core 21 decrements the value of the Y-coordinate of the designation reference position P by a predetermined amount, and when the lower switch of the cross switch 14a is pressed, the CPU core 21 increments the value of the Y-coordinate of the designation reference position P by a predetermined amount. The CPU core 21 then moves the designation line 40a and the designation line 40b in response to the update of the coordinate values of the designation reference position P. Here, as with the process in step S18, in accordance with the value of the counter i, the coordinate values indicating the i-th designation reference position P stored in the designation reference position list 53 are updated. Next, the CPU core 21 returns the processing to step S15.

As above described, in the processes in step S16 to step S19, during the period until touch-off is detected, the designation reference position P is moved in accordance with the movement of the touched position (step S18), or the designation reference position P is moved by the user using the cross switch 14a (step S19).

On the other hand, in step S15, in the case where touch-off is detected, the CPU core 21 performs the process in step S20. In step S20, the CPU core 21 determines whether or not the touched position at which touch-off is performed stays within the designation range frame. Specifically, the CPU core 21 calculates the touched position in accordance with the immediately preceding position data 51b (the voltage value indicating the touched position at which touch-off is performed) stored in the input coordinate list 51, and determines whether or not the touched position stays within the designation range frame 41. When the determination result is Yes, the CPU core 21 performs a process in step S21. When the determination result is No, the CPU core 21 displays a character string encouraging the user to perform another input, and returns the processing to step S14.

In step S21, the CPU core 21 associates the touched position at which touch-off is performed with the coordinate values of the designation reference position P and stores them in the RAM 24. Specifically, the CPU core 21 stores the immediately preceding position data 51b (the voltage value indicating the touched position at which touch-off is performed), which is stored in the input coordinate list 51, as the i-th fixed position data in the fixed position list 52. Accordingly, the fixed position data is associated with the designation reference position P by using the counter i. Namely, the i-th designation reference position P stored in the designation reference position list 53 and the i-th fixed position data stored in the fixed position list 52 are associated with each other by using the value of the counter i (as a pair of correction data). Next, the CPU core 21 performs a process in step S22.

In step S22, the CPU core 21 determines whether or not the counter i is smaller than the natural number n. Here, the natural number n is the number of times the user is encouraged to designate the designation reference position P, and is the number of times the designation image (the designation line 40a, the designation line 40b, and the designation range frame 41) shown in FIG. 3 or FIG. 8 is displayed. In the present embodiment, the natural number n is previously determined, and satisfies n=2. When the determination result is Yes, the CPU core 21 determines that the designation performed by the user does not satisfy the predetermined number of times n, and returns the processing to step S12. When the determination result is No, the CPU core 21 performs a process in step S23 subsequently for calculation of the correction formula.

In step S23, the CPU core 21 calculates the correction formula in accordance with n pairs of the designation reference position P and the fixed position data, which are stored in the RAM 24. Specifically, the CPU core 21 regards the i-th designation reference position P stored in the designation reference position list 53 and the i-th fixed position data stored in the fixed position list 52 as a pair of correction data, and in accordance with the n pairs of correction data, calculates the correction formula. In the present embodiment, the correction formula for correction in the X-axis and Y-axis directions is calculated as follows. That is, for correction in the X-axis direction (lateral direction), the CPU core 21 calculates a potential difference Vdx between the voltage value relative to the X-coordinate of the first fixed position and the voltage value relative to the X-coordinate of the second fixed position. Next, the CPU core 21 calculates a difference Cdx between the X-coordinate value of the first designation reference position P and the X-coordinate value of the second designation reference position P. Further, the CPU core 21 calculates an amount of change in the voltage per 1 dot of the screen (second LCD 12) by dividing Vdx by Cdx. The CPU core 21 uses the X-coordinate value of the first designation reference position P and the voltage value relative to the X-coordinate of the first fixed position as references, and calculates, based on the calculated amount of change in the voltage per 1 dot, the voltage value at each coordinate point (point relative to the X-coordinate). As above described, in relation to the X-axis, the correction formula for a straight line indicating the relation between the voltage value detected by the touch panel 15 and the coordinate value on the second LCD 12 is calculated. Further, the correction formula relative to the Y-axis direction (vertical direction) is also calculated in a similar manner. After calculating the correction formula, the CPU core 21 performs a predetermined process, and ends the processing. Here, as the predetermined process, the CPU core 21 checks whether or not the calculated correction formula is correct. When the correction formula is correct, the CPU core 21 saves the parameters of the calculated correction formula in the nonvolatile memory in the game apparatus 10. When the calculated correction formula is not correct, the CPU core 21 displays a message indicating that the calibration has failed, and ends the processing (or executes the calibration processing from the beginning). It is noted that whether or not the calculated correction formula is correct is checked by encouraging the user to designate a designation image displayed at the central position on the second LCD 12.

As above described, the voltage value detected by the touch panel 15 is corrected in accordance with the calculated correction formula, whereby it is possible to overcome the deviation between the designation reference position on the second LCD 12 and the position detected by the touch panel 15.

In the present embodiment, the designation line 40a and the designation line 40b are moved by using the cross switch 14a. However, the designation line 40a and the designation line 40b may be moved by using the A button 14d, the B button 14e, the X button 14f, and the Y button 14g. In this case, for example, in order to move the designation line 40a, the A button 14d and the Y button 14g may be used for movement in the positive direction and negative direction of the X-axis, respectively. In the same manner, in order to move the designation line 40b, the B button 41e and the X button 14f may be used for movement in the positive direction and negative direction of the Y-axis, respectively. Further, the L button or the R button may be used for movement of the designation reference position P1. Still further, in another embodiment, various input apparatuses (e.g., a joy stick, mouse, or the like which is capable of inputting a relative moving direction and an amount of movement) may be used for movement of the designation reference position P.

Further, the CPU core 21 determines the touched position at which touch-off is performed as the fixed position when touch-off on the touch panel 15 is detected. However, it may be designed such that when the A button 14d is pressed while the touch-on state relative to the touch panel 15 is maintained, the CPU core 21 determines the touched position at that time as the fixed position. That is, in this case, the user moves the designation reference position P by using the cross switch 14a while the stick 16 is kept touching the touch panel 15, and presses the A button 14d, thereby to fix the touched position.

Further, in the present embodiment, the CPU core 21 displays the designation line 40a and the designation line 40b, thereby displaying the designation reference position P. However, in another embodiment, any image may be displayed as long as the image indicates the designation reference position P. For example, a point image indicating the designation reference position P may be displayed. Alternatively, in another embodiment, the designation range frame 41 need not necessarily be displayed.

In the above description, in the calibration processing, the designation reference position P is displayed two times. However, it may be possible to cause the user to indicate the designation reference position P for a plurality of number of times by displaying the designation reference position P for a plurality of number of times (three times or more). In this case, it is preferable that the designation lines 40a and 40b are displayed such that the designation reference position P always takes a different predetermined position. In this case, the correction formula may be calculated further accurately. Namely, in above step S23, the CPU core 21 performs a so-called linear correction by using two points designated by the user. In another embodiment, by encouraging the user to designate a plurality of points, the CPU core 21 calculates a curved line indicating more accurate relation between the designation reference position P and the voltage value, and performs correction based on the calculated curved line. In this manner, in the calibration processing, the designation reference position P is designated for a plurality of number of times, whereby highly accurate calibration can be executed. On the other hand, in another embodiment, the correction formula may be calculated based on the display of the designation reference position P one time. The relation between the position on the touch panel 15 and the voltage value is represented as a straight line having a predetermined gradient. However, there may be a case where the straight line is displaced while keeping the same gradient. Therefore, in order to solve the deviation, the CPU core 21 causes the user to indicate one point on the second LCD 12, for example, the central position as the designation reference position P. In this manner, the calibration is executed by designating the designation reference position P one time.

Further, in the present embodiment, the data outputted from the touch panel 15 is the voltage value, and the correction formula is calculated by using the voltage value. In another embodiment, the data outputted from the touch panel may be the coordinate values on the touch panel, and the correction formula may be calculated by using the coordinate values and coordinate values on the second LCD 12. Namely, the user moves the designation reference position P, and fixes the touched position, so as to cause the designation reference position P to coincide with the fixed position (on the touch panel). The deviation between the coordinate values of designation reference position P and the coordinate values of the fixed position at that time may be then calculated as the correction value. Accordingly, it is possible to calculate the correction value for causing the position on the second LCD 12 to coincide with the position on the touch panel.

Further, in the present embodiment, the touch panel 15 of a resistive film type has been described as an example, however, it is understood that the present calibration method can be utilized for a touch panel of any other type (e.g., an optical type (infrared type) or a capacitive coupling type).

Further, the calibration program according to the present invention can be utilized for performing calibration on an apparatus including the designation detection means other than the touch panel. For example, for an apparatus in which means for detecting touching by a user and display means are located physically different positions, and in which the position on the means for detecting touching and the position on the display means are previously associated with each other, the calibration program according to the present invention can be utilized for correction of these positions.

Further, in another embodiment, the present calibration method may be applied to an apparatus having no touch panel, e.g., a stationary game apparatus described below. That is, the stationary game apparatus described herein is a stationary game apparatus which displays a video on a television receiver (referred to as television) or the like, and includes a controller for indicating a position on the television screen. The controller has a plurality of operation switches, and is connected to the game apparatus body wirelessly. In the game apparatus, the controller receives the infrared radiation emitted from a marker provided on the top of the television, whereby the user indicates a position (performs pointing) on the television screen using the controller. The game apparatus constantly performs detection of the pointing position pointed at by the user. The position (pointing position) on the television screen indicated by the user is preferably a position at which a straight line extending from the front edge portion of the controller in the longitudinal direction of the controller intersects with the screen surface of the television. The above-described calibration method is also useful for such a game apparatus. That is, there may be a case where the position which is considered by the user as the position, on the television screen, pointed at by using the controller is different from the position on the television screen which is actually pointed at. Such deviation between the positions can be corrected by using the above-described method. Specifically, a designation reference position P is displayed on the television screen, and the user points at a position on the television screen using the controller and presses an operation switch of the controller while keeping pointing. Accordingly, the position which is considered by the user as to be pointed at on the television screen is determined, and then an input operation starts (an operation similar to that of the touch-on in step S14 shown in FIG. 10). The user causes the designation reference position P on the television screen to coincide with the position which is considered to be pointed at by the user by using the operation switch. In this case, when the pointing position has been moved by an operation of the controller by the user, the designation reference position P also moves in accordance with the moving direction and an amount of the movement. The user operates the operation switch to end the input operation, and fixes the pointing position at that time as the fixed position (an operation similar to that of the touch-off in step S15 shown in FIG. 10). In this manner, the calibration processing is performed. Alternatively, a laser pointer is mounted to the controller, and deviation between the position pointed at by the laser pointer and the position indicated on the television screen may be corrected.

In the above embodiment, the designation reference position is initially displayed at a predetermined position on the display means (second LCD 12) by using the designation image (designation lines 40a and 40b). However, in another embodiment, the designation reference position need not be displayed initially. For example, a position corresponding to a designation start position (a touch-on position, or in the case of the above stationary game apparatus, a pointing position by the controller at which the operation switch has been pressed) is set as the designation reference position on the display means, and a designation image representing the designation reference position may be displayed on the display means. That is, in the calibration processing, the designation image is not displayed initially, but the designation image is displayed at a position corresponding to the position at which the user has started designation. Next, the user moves the designation image using the cross switch so as to cause the position at which the designation image is displayed to coincide with the designated position by the user. The calibration processing may be executed in this manner.

As described above, the present invention allows the user to perform a simple and accurate calibration, and may be utilized as calibration program executed in a game apparatus or as a coordinate detection device, for example.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon a calibration program executed on a computer of an information processing apparatus which is capable of utilizing a designation detection device configured to detect a position designation by a user and an input device configured to accept user input, the input device being different than the designation detection device, the calibration program causing the computer to:

set an initial designation reference position independently of user provided positional input from the designation detection device;

display, on a display device, a predetermined designation image in accordance with the initial designation reference position that is set independently of user provided positional input from the designation detection device;

accept, while the designation image is displayed, a first input that is based on the user using the designation detection device to indicate a start position on the display device;

after receiving the first input, accept continuous positional designations that correspond to locations on the display device, where the continuous positional designations are based on movements of the position designator to indicate different locations on the display device;

move, while the continuous positional designations are being accepted, the displayed designation image in accordance with the accepted continuous positional designations;

accept, while the designation image is displayed, a second input provided by the user using the input device that is different than the position designator, the second input for moving the displayed designation image so as to coincide with an indicated position that corresponds to the continuous positional designations;

move the displayed designation image in accordance with the accepted second input provided by the user using the input device, the moving of the displayed designation image in accordance with the accepted second input being independent of movement of the positional designator input device;

set, while the designation image is displayed after being moved in accordance with the accepted second input provided by the user using the input device, a fixed position at an end of the continuous positional designations performed by the user; and execute calibration processing in accordance with the fixed position and an end designation reference position that corresponds to the designation image that was moved in accordance with the accepted continuous positional designations and the accepted second input provided by the user using the input device.

2. The non-transitory computer readable storage medium of claim 1, wherein the designation detection device is a touch panel.

3. The non-transitory computer readable storage medium of claim 2, wherein the end of the continuous positional designations is a touch-off action performed on the touch panel.

4. The non-transitory computer readable storage medium of claim 1, wherein the calibration program further causes the computer to:

display, on the display device, a designation range image indicating a predetermined range including the designation reference position, and the calibration processing is executed only when the fixed position stays within the predetermined range.

5. The non-transitory computer readable storage medium of claim 1, wherein the input device is further configured to perform a relative movement designation in accordance with an operation by the user, thereby to move the designation reference position.

6. The non-transitory computer readable storage medium of claim 5, wherein the input device includes a direction designation switch.

7. The non-transitory computer readable storage medium of claim 1, wherein the calibration program further causes the computer to:

repeat display of the designation image for a predetermined number of cycles;

change the designation reference position at each cycle;

fix the fixed position for each cycle, while the designation image display unit repeats the display of the designation image for the predetermined number of cycles; and set the designation reference position and the fixed position at each cycle as a pair of correction data, wherein the calibration processing is executed in accordance with each pair of correction data.

8. The non-transitory computer readable storage medium of claim 1, wherein the continuous positional designations are determined through user operation of a pointing device and the end of the continuous positional designations actuation of a button.

9. A computing apparatus that utilizes a position designator configured to detect a position designation by a user and an input device configured to accept user input, the input device being different than the position designator, the computing apparatus comprising:

a processing system that includes at least one processor, the processing system configured to:

set an initial designation reference position independently of user provided positional input from the position designator;

output a designation image to a display device in accordance with the initial designation reference position that is set independently of user provided positional input from the position designator;

accept, while the designation image is output to the display device, a first input that is based on the user using the position designator to indicate a start position on the display device;

after receiving the first input, accept continuous positional designations that correspond to locations on the display device, where the continuous positional designations are based on movements of the position designator to indicate different locations on the display device;

move, while the continuous positional designations are being accepted, the displayed designation image in accordance with the accepted continuous positional designations;

accept, while the designation image is displayed, a second input provided by the user using the input device that is different than the position designator, the second input for moving the displayed designation image so as to coincide with an indicated position that corresponds to the continuous positional designations;

move, while the designation image is displayed, the displayed designation image in accordance with the accepted second input provided by the user using the input device, the moving of the displayed designation image in accordance with the accepted second input being independent of movement of the positional designator input device;

set, while the designation image is displayed after being moved in accordance with the accepted second input provided by the user using the input device, a fixed position at an end of the continuous positional designations performed by the user; and execute calibration processing in accordance with the fixed position and an end designation reference position that corresponds to the designation image that was moved in accordance with the accepted continuous positional designations and the accepted second input provided by the user using the input device.

10. The apparatus of claim 9, wherein the end of the continuous positional designations includes a touch-off operation performed on a touch panel or user operation of a switch.

11. A calibration method for a computing apparatus that utilizes a position designator operated by a user and an input device operated by the user, the input device being different than the position designator, the method comprising:

setting an initial designation reference position independently of user provided positional input from the position designator;

displaying, on a display device, a designation image in accordance with the initial designation reference position that is set independently of user provided positional input from the position designator;

receiving, while the designation image is displayed, a first input that is based on the user using the position designator to indicate a start position on the display device;

after receiving the first input, receive continuous positional designations that correspond to locations on the display device, where the continuous positional designations are based on movements of the position designator to indicate different locations on the display device;

moving, while the continuous positional designations are being received, the displayed designation image in accordance with the received continuous positional designations;

receiving, while the designation image is displayed, a second input provided by the user using the input device that is different than the position designator, the second input for moving the displayed designation image so as to coincide with an indicated position that corresponds to the continuous positional designations;

moving, using the at least one processor, the displayed designation image in accordance with the received second input provided by the user using the input device, the moving of the displayed designation image in accordance with the received second input being independent of movement of the positional designator input device;

setting, while the designation image is displayed after being moved in accordance with the received second input provided by the user using the input device, a fixed position at an end of the continuous positional designations performed by the user; and executing calibration processing, on the computing apparatus, in accordance with the fixed position and an end designation reference position that corresponds to the designation image that was moved in accordance with the receive continuous positional designations and the received second input provided by the user using the input device.

12. The method of claim 11, wherein the end of the continuous positional designations includes at least one of: 1) a touch-off operation performed on a touch panel; and 2) actuation of a user togglable switch.

* * * * *